April 24, 1956   G. SCHACK ET AL   2,742,896
FUEL BURNING HOT AIR GENERATOR
Filed Jan. 2, 1951

INVENTOR:
GUNTHER SCHACK
BY:
Michael S. Striker
Agt.

United States Patent Office 2,742,896
Patented Apr. 24, 1956

2,742,896

FUEL BURNING HOT AIR GENERATOR

Günther Schack, Dusseldorf-Meererbusch, and Gert Wellensiek and Gerhard Schefels, Dusseldorf, Germany, assignors to Rekuperator K. G. Dr. Ing. Schack & Company, Dusseldorf, Germany, a German company Application January 2, 1951, Serial No. 203,906

Claims priority, application Germany January 2, 1950

8 Claims. (Cl. 126—110)

The invention relates to a hot air generator of particularly high efficiency and simple construction. It is known in hot air generators to mount a recuperator on a combustion chamber and to surround both by a common casing.

Based on this known construction, the invention consists in that the gas to be heated is conducted in the recuperator in a direction of flow transversely of the heating pipes through an annular space surrounding the combustion chamber and in counter-flow to the combustion gases. This may be attained by a construction and disposition of guide plates, so that the air to be heated is passed around the pipes pasing through the recuperator, first in a transverse direction to the side of the recuperator opposite the inlet opening, and then centrally into an annular space between the combustion chamber and the common casing. An intermediate floor, above which the air flows in the transverse direction of the pipes of the recuperator, is advantageously provided in the recuperator above the roof of the combustion chamber, to form a marrow space through which the air is passed to the annular space surrounding the combustion chamber.

In this manner a positive guiding of the gases to be heated is effected in each part of the recuperator. The recuperator is loaded as uniformly as possible, and the whole recuperator is used. No dead pockets are formed. All parts of the hot air generator are, however, of simple construction, and in particular the combustion chamber is readily accessible. The front part of the annular space of the combustion chamber is interrupted, by the doors for charging, stoking, and for the ashes, which doors are combined at this position in one common frame, which is installed as a unit in the common casing and may be readily removed from it. Brickwork in the shaft, or similar repair work may be carried out quickly by removing the common frame which renders the combustion chamber readily accessible.

One construction of hot air generator according to the invention is diagrammatically illustrated by way of example in the accompanying drawings, in which Figure 1 is a longitudinal sectional front elevation taken along line 1—1 of Fig. 3.

Figure 1:
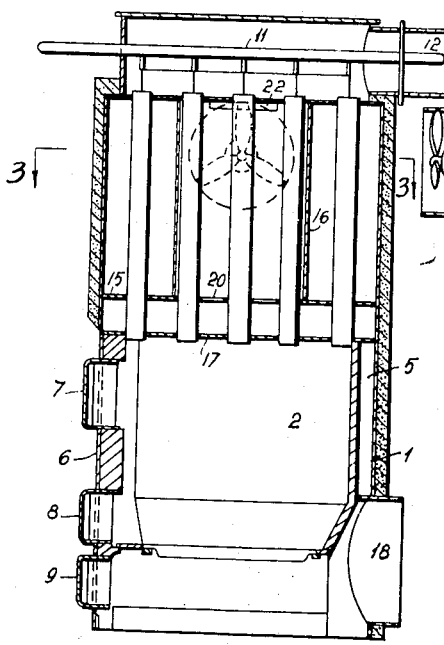
Figure 2:
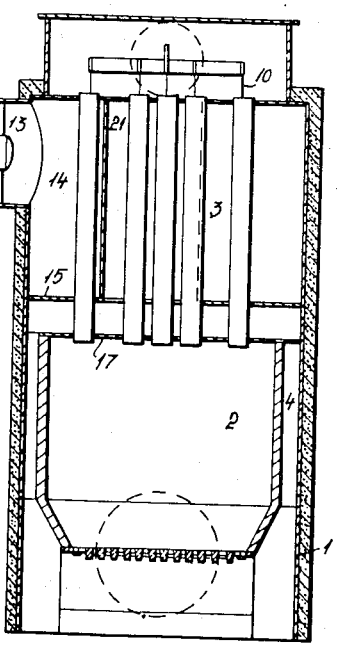
Figure 2 is a corresponding sectional side elevation taken along line 2—2 of Fig. 3.
Figure 3:
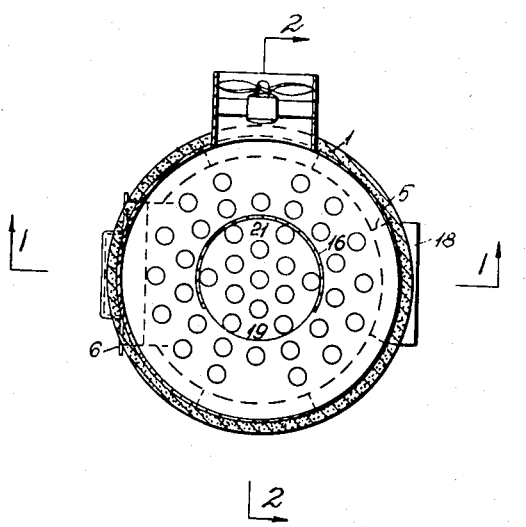
Figure 3 is a transverse section taken along line 3—3 of Figure 1.

Referring to the drawings, the combustion chamber 2 and the recuperator, provided with vertical traversing tubes 3, are provided within a heat insulated common outer casing 1. Between the combustion chamber 2 and the insulated casing 1 there is formed an annular air space 4, which is divided into a number of segments by means of distance plates 5. The casing 1 is formed at the front with an opening. In the opening is mounted a frame 6, in which are provided the door 7, through which the furnace is charged, the door 8 serving for stoking, and the door 9 for removal of the ashes. The frame 6 may be readily removed so that, in spite of the surrounding insulated casing 1, the combustion chamber 2 is easily accessible. The recuperator tubes 3 may also be readily cleaned from this position, which in addition is also facilitated by suspended chains 10. The chains 10 may be set in motion by a rod 11 mounted at the top of the hot air generator.

The combustion gases flow first through the chamber 2 and then pass directly through the tubes 3 in the recuperator. When they have given up the greater part of their heat, they escape through the outlet 12.

The air to be heated is passed in through pressure of the blower 30 through the inlet opening 13 in the recuperator and the casing space 14, and strikes against a vertical part-cylindrical member or baffle 16 which is open on the side opposite the inlet 13, at 19, for approximately one-third of the circumference, and which divides the air flow into two. The two currents of air flow in opposite directions around the member 16 between the tubes 3 above an annular plate 15, and then through the opening 19 of the part-cylindrical member 16, around the pipes provided therein. The air then passes through a central opening 20 at the bottom of the member 16 downwardly to strike against the roof-plate 17 of the combustion chamber 2. The distance of the intermediate floor 15 from the roof-plate 17 is kept so small that the air, after striking against the roof plate 17, is caused to flow at high speed along the roof plate 17. Thus a high heat transmitting value is obtained, and a high cooling effect of the plate 17 which would otherwise be endangered by strong radiation from the furnace. The opening 20 is also deliberately kept small, so as to obtain a great impact speed of the air current on the plate 17 if, as is generally the case, the air comes from above. A slot 22 is left open at the top edge of the part-cylinder 16 so as to ensure against the air not flowing around the tubes which are provided close to the cylinder wall in the dead space 21. The gap 22 is of such dimensions as to allow about 15% of the air to flow through it and around the tubes provided in the dead space 21.

When the air has left the recuperator, it flows on all sides into the annular space 4 around the combustion chamber and then, heated to a maximum, passes through outlet 18 to the place of consumption.

The drawing illustrates how, owing to full utilisation of the technical knowledge on flow and heat transmission, it is possible to ensure satisfactory operation with common cast steel, in spite of high temperatures, and at the same time to combine high performance and increased efficiency with safe working and cheap construction. The invention is primarily intended for hot air generators, but it may also be used for hot gas generators, which may for the purpose of the invention be considered as equivalent to hot air generators.

We claim:

1. A heating device, comprising in combination, an inner casing having a top wall and side walls defining a combustion chamber; inlet means in said casing for supplying combustion air to said combustion chamber in said inner casing; an outer casing surrounding said inner casing and spaced therefrom so as to provide an annular space between said inner and outer casings, said outer casing extending upwardly from said inner casing and provided with a top wall so as to define a heating chamber above the top wall of said inner casing; upwardly extending tubular means located within said heating chamber, said tubular means communicating at its lower end with said combustion chamber in said inner casing; outlet means at the upper end of said tubular means for exhausting the gases heated in said combustion chamber and passing upwardly through said tubular means; air entrance and directing means in said outer casing directing air into and through said heating chamber and in heat exchanging relation with said tubular means for preheating said air; a partition having a central opening, arranged in said heating chamber extending transversely therein, and being closely adjacent to but spaced above said top wall of said inner casing so as to form a shallow transverse passage communicating at its center with said heating chamber and communicating at its periphery with said annular space between said inner and outer casings; air exhaust means in said outer casing communicating with said annular space between said inner and outer casings, whereby air entering said heating chamber is adapted to flow transversely and downwardly around said tubular means while being heated thereby and is adapted to pass rapidly through said shallow transverse passage so as to flow along the top wall of said inner casing and to be further heated thereby, the thus heated air then passing downwardly through said annular space to be exhausted through said air exhaust means and means causing said air to flow from said air entrance means through said heating chamber, said shallow transverse passage and said annular space to said air exhaust means.

2. A heating device, comprising in combination, an inner casing having a top wall and side walls defining a combustion chamber; inlet means in said casing for supplying combustion air to said combustion chamber in said inner casing; an outer casing surrounding said inner casing and spaced therefrom so as to provide an annular space between said inner and outer casings, said outer casing extending upwardly from said inner casing and provided with a top wall so as to define a heating chamber above the top wall of said inner casing; upwardly extending tubular means located within said heating chamber, said tubular means communicating at its lower end with said combustion chamber in said inner casing; outlet means at the upper end of said tubular means for exhausting the gases heated in said combustion chamber and passing upwardly through said tubular means; air entrance and directing means at the top of said outer casing directing air into and through said heating chamber and in heat exchanging relation with said tubular means for preheating said air; a partition having a central opening, arranged in said heating chamber extending transversely therein, and being closely adjacent to but spaced above said top wall of said inner casing so as to form a shallow transverse passage communicating at its center with said heating chamber and communicating at its periphery with said annular space between said inner and outer casings; air exhaust means at the bottom of said outer casing communicating with said annular space between said inner and outer casings, whereby air entering said heating chamber is adapted to flow transversely and downwardly around said tubular means while being heated thereby and is adapted to pass rapidly through said shallow transverse passage so as to flow along the top wall of said inner casing and to be further heated thereby, the thus heated air then passing downwardly through said annular space to be exhausted through said air exhaust means and means causing said air to flow from said air entrance means through said heating chamber, said shallow transverse passage and said annular space to said air exhaust means.

3. A heating device, comprising in combination, an inner casing having a top wall and side walls defining a combustion chamber; inlet means in said casing for supplying combustion air to said combustion chamber in said inner casing; an outer casing surrounding said inner casing and spaced therefrom so as to provide an annular space between said inner and outer casings, said outer casing extending upwardly from said inner casing and provided with a top wall so as to define a heating chamber above the top wall of said inner casing; upwardly extending tubular means located within said heating chamber, said tubular means communicating at its lower end with said combustion chamber in said inner casing; outlet means at the upper end of said tubular means for exhausting the gases heated in said combustion chamber and passing upwardly through said tubular means; air entrance and directing means in said outer casing directing air into and through said heat-chamber and in heat exchanging relation with said tubular means for preheating said air; an annular partition plate having a central opening, arranged in said heating chamber extending transversely therein contacting at its periphery the inner surface of said outer casing, and being closely adjacent to but spaced above said top wall of said inner casing so as to form a shallow transverse passage communicating at its center with said heating chamber and communicating at its periphery with said annular space between said inner and outer casings; air exhaust means in said outer casing communicating with said annular space between said inner and outer casings, whereby air entering said heating chamber is adapted to flow transversely and downwardly around said tubular means while being heated thereby and is adapted to pass rapidly through said shallow transverse passage so as to flow along the top wall of said inner casing and to be further heated thereby, the thus heated air then passing downwardly through said annular space to be exhausted through said air exhaust means and means causing said air to flow from said air entrance means through said heating chamber, said shallow transverse passage and said annular space to said air exhaust means.

4. A heating device, comprising in combination, an inner casing having a top wall and side walls defining a combustion chamber; inlet means in said casing for supplying combustion air to said combustion chamber in said inner casing; an outer casing surrounding said inner casing and spaced therefrom so as to provide an annular space between said inner and outer casings, said outer casing extending upwardly from said inner casing and provided with a top wall so as to define a heating chamber above the top wall of said inner casing; a plurality of upwardly extending tubular members located within said heating chamber, said tubular members communicating at their lower ends with said combustion chamber in said inner casing; outlet means at the upper ends of said tubular members for exhausting the gases heated in said combustion chamber and passing upwardly through said tubular members; air entrance and directing means in said outer casing directing air into and through said heating chamber and in heat exchanging relation with said tubular members for preheating said air; a partition having a central opening, arranged in said heating chamber extending transversely therein, and being closely adjacent to but spaced above said top wall of said inner casing so as to form a shallow transverse passage communicating at its center with said heating chamber and communicating at its periphery with said annular space between said inner and outer casings; air exhaust means in said outer casing communicating with said annular space between said inner and outer casings, whereby air entering said heating chamber is adapted to flow transversely and downwardly around said tubular members while being heated thereby and is adapted to pass rapidly through said shallow transverse passage so as to flow along the top wall of said inner casing and to be further heated thereby, the thus heated air then passing downwardly through said annular space to be exhausted through said air exhaust means and means causing said air to flow from said air entrance means through said heating chamber, said shallow transverse passage and said annular space to said air exhaust means.

5. A heating device, comprising in combination, an inner casing having a top wall and side walls defining a combustion chamber; inlet means in said casing for supplying combustion air to said combustion chamber in said inner casing; an outer casing surrounding said inner casing and spaced therefrom so as to provide an annular space between said inner and outer casings, said outer casing extending upwardly from said inner casing and provided with a top wall so as to define a heating chamber above the top wall of said inner casing; upwardly extending tubular means located within said heating chamber, said tubular means communicating at its lower end with said combustion chamber in said inner casing; outlet means at the upper end of said tubular means for exhausting the gases heated in said combustion chamber and passing upwardly through said tubular means; air entrance and directing means in said outer casing directing the air into and through said heating chamber and in heat exchanging relation with said tubular means for preheating said air; a partition having a central opening, arranged in said heating chamber extending transversely therein, and being closely adjacent to but spaced above said top wall of said inner casing so as to form a shallow transverse passage communicating at its center with said heating chamber and communicating at its periphery with said annular space between said inner and outer casings; a single part-cylindrical member arranged centrally in said heating chamber extending upwardly from said partition with its open side facing in a direction away from said air entrance means; air exhaust means in said outer casing communicating with said annular space between said inner and outer casings, whereby air entering said heating chamber is adapted to flow transversely and downwardly around said tubular means while being heated thereby and is adapted to pass rapidly through said shallow transverse passage so as to flow along the top wall of said inner casing and to be further heated thereby, the thus heated air then passing downwardly through said annular space to be exhausted through said air exhaust means and means causing said air to flow from said air entrance means through said heating chamber, said shallow transverse passage and said annular space to said air exhaust means.

6. A heating device, comprising in combination, an inner casing having a top wall and side walls defining a combustion chamber; inlet means in said casing for supplying combustion air to said combustion chamber in said inner casing; an outer casing surrounding said inner casing and spaced therefrom so as to provide an annular space between said inner and outer casings, said outer casing extending upwardly from said inner casing and provided with a top wall so as to define a heating chamber above the top wall of said inner casing; upwardly extending tubular means located within said heating chamber, said tubular means communicating at its lower end with said combustion chamber in said inner casing; outlet means at the upper end of said tubular means for exhausting the gases heated in said combustion chamber and passing upwardly through said tubular means; air entrance means in said outer casing opening into said heating chamber for supplying air to said heating chamber; a partition having a central opening, arranged in said heating chamber extending transversely therein, and being closely adjacent to but spaced above said top wall of said inner casing so as to form a shallow transverse passage communicating at its center with said heating chamber and communicating at its periphery with said annular space between said inner and outer casing; a single part-cylindrical member arranged centrally in said heating chamber extending around the opening in said partition and upwardly from said partition with its open side facing in a direction away from said air entrance means, the diameter of said part-cylindrical member being substantially the same as said central opening of said partition; air exhaust means in said outer casing communicating with said annular space between said inner and outer casings, whereby air entering said heating chamber is adapted to flow transversely and downwardly around said tubular means while being heated thereby and is adapted to pass rapidly through said shallow transverse passage so as to flow along the top wall of said inner casing and to be further heated thereby, the thus heated air then passing downwardly through said annular space to be exhausted through said air exhaust means and means causing said air to flow from said air entrance means through said heating chamber, said shallow transverse passage and said annular space to said air exhaust means.

7. A heating device, comprising in combination, an inner casing having a top wall and side walls defining a combustion chamber; inlet means in said casing for supplying combustion air to said combustion chamber in said inner casing; an outer casing surrounding said inner casing and spaced therefrom so as to provide an annular space between said inner and outer casings, said outer casing extending upwardly from said inner casing and provided with a top wall so as to define a heating chamber above the top wall of said inner casing; upwardly extending tubular means located within said heating chamber, said tubular means communicating at its lower end with said combustion chamber in said inner casing; outlet means at the upper end of said tubular means for exhausting the gases heated in said combustion chamber and passing upwardly through said tubular means; air entrance means in said outer casing opening into said heating chamber for supplying air to said heating chamber; a partition having a central opening, arranged in said heating chamber extending transversely therein, and being closely adjacent to but spaced above said top wall of said inner casing so as to form a shallow transverse passage communicating at its center with said heating chamber and communicating at its periphery with said annular space between said inner and outer casings; a part-cylindrical member arranged centrally in said heating chamber extending upwardly from said partition to the top wall of said outer casing and arranged with its open side facing in a direction away from said air entrance means, said part-cylindrical member being formed at its upper end with a gap in its wall; air exhaust means in said outer casing communicating with said annular space between said inner and outer casings, whereby air entering said heating chamber is adapted to flow transversely and downwardly around said tubular means while being heated thereby and is adapted to pass rapidly through said shallow transverse passage so as to flow along the top wall of said inner casing and to be further heated thereby, the thus heated air then passing downwardly through said annular space to be exhausted through said air exhaust means and means causing said air to flow from said air entrance means through said heating chamber, said shallow transverse passage and said annular space to said air exhaust means.

8. A heating device, comprising in combination, an inner casing having a top wall and side walls defining a combustion chamber; inlet means in said casing for supplying combustion air to said combustion chamber in said inner casing; an outer casing surrounding said inner casing and spaced therefrom so as to provide an annular space between said inner and outer casings, said outer casing extending upwardly from said inner casing and provided with a top wall so as to define a heating chamber above the top wall of said inner casing; a plurality of upwardly extending tubular members located within said heating chamber, said tubular members communicating at their lower ends with said combustion chamber in said inner casing; outlet means at the upper ends of said tubular members for exhausting the gases heated in said combustion chamber and passing upwardly through said tubular members, air entrance and directing means in said outer casing directing air into and through said heating chamber and in heat exchanging relation with said tubular members for preheating said air; an annular partition plate having a central opening, arranged in said heating chamber extending transversely therein contacting at its periphery the inner surface of said outer casing, and being closely adjacent to but spaced above said top wall of said inner casing so as to form a shallow transverse passage communicating at its center with said heating chamber and communicating at its periphery with said annular space between said inner and outer casings; air exhaust means in said outer casing communicating with said annular space between said inner and outer casings, whereby air entering said heating chamber is adapted to flow transversely and downwardly around said tubular members while being heated thereby and is adapted to pass rapidly through said shallow transverse passage so as to flow along the top wall of said inner casing and to be further heated thereby, the thus heated air then passing downwardly through said annular space to be exhausted through said air exhaust means and means causing said air to flow from said air entrance means through said heating chamber, said shallow transverse passage and said annular space to said air exhaust means.

References Cited in the file of this patent

UNITED STATES PATENTS

| | | |
|---|---|---|
| 566,450 | Edgar | Aug. 25, 1896 |
| 727,391 | Leman | May 5, 1903 |
| 1,144,469 | Giles | June 29, 1915 |
| 2,047,121 | Winterfeldt | July 7, 1936 |
| 2,286,665 | Blair | June 16, 1942 |
| 2,462,395 | Heiman | Feb. 22, 1949 |
| 2,600,020 | Pietsch | June 10, 1952 |

FOREIGN PATENTS

| | | |
|---|---|---|
| 641,271 | France | Apr. 14, 1928 |
| 717,858 | Germany | Feb. 25, 1942 |